Patented Feb. 21, 1928.

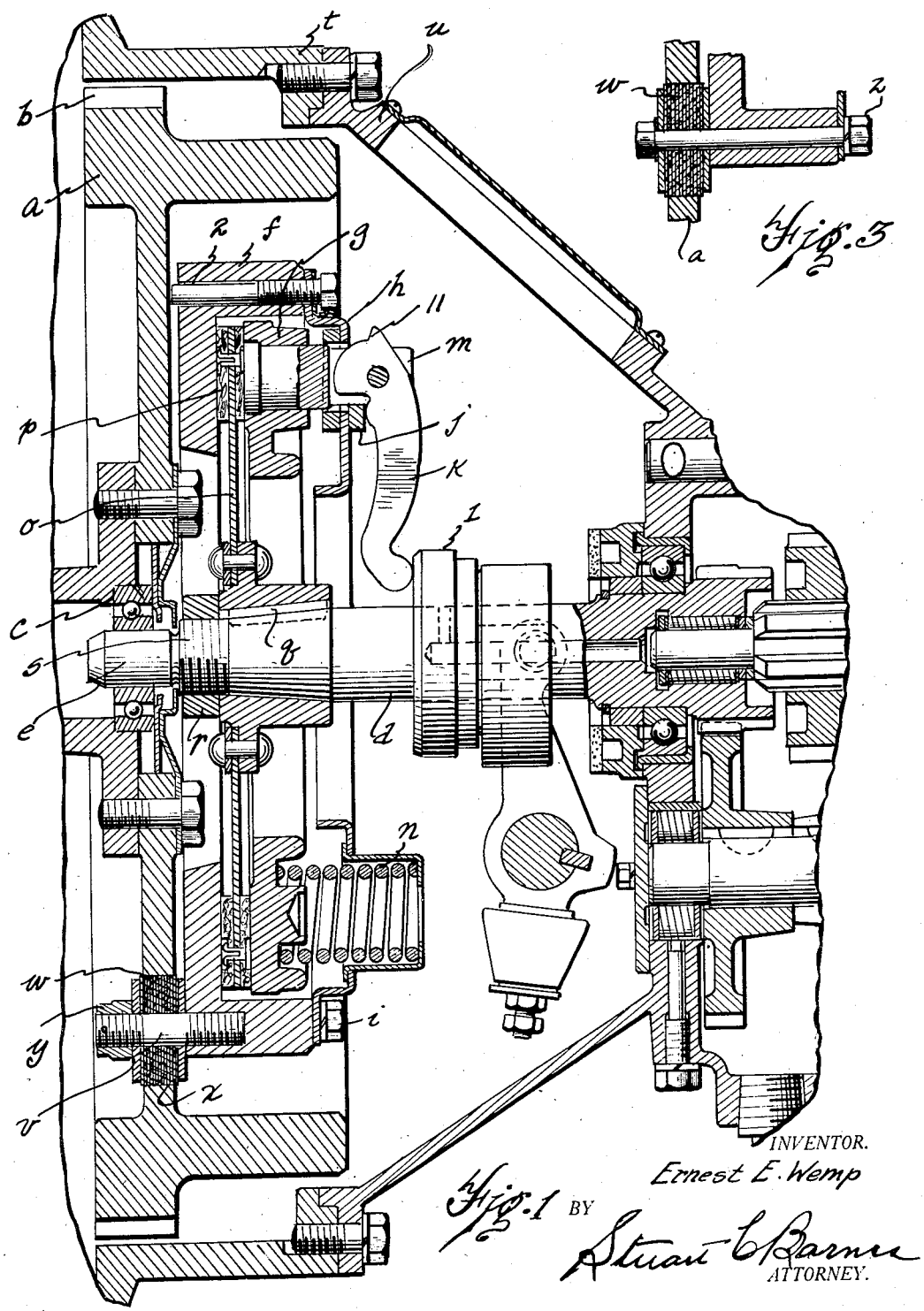

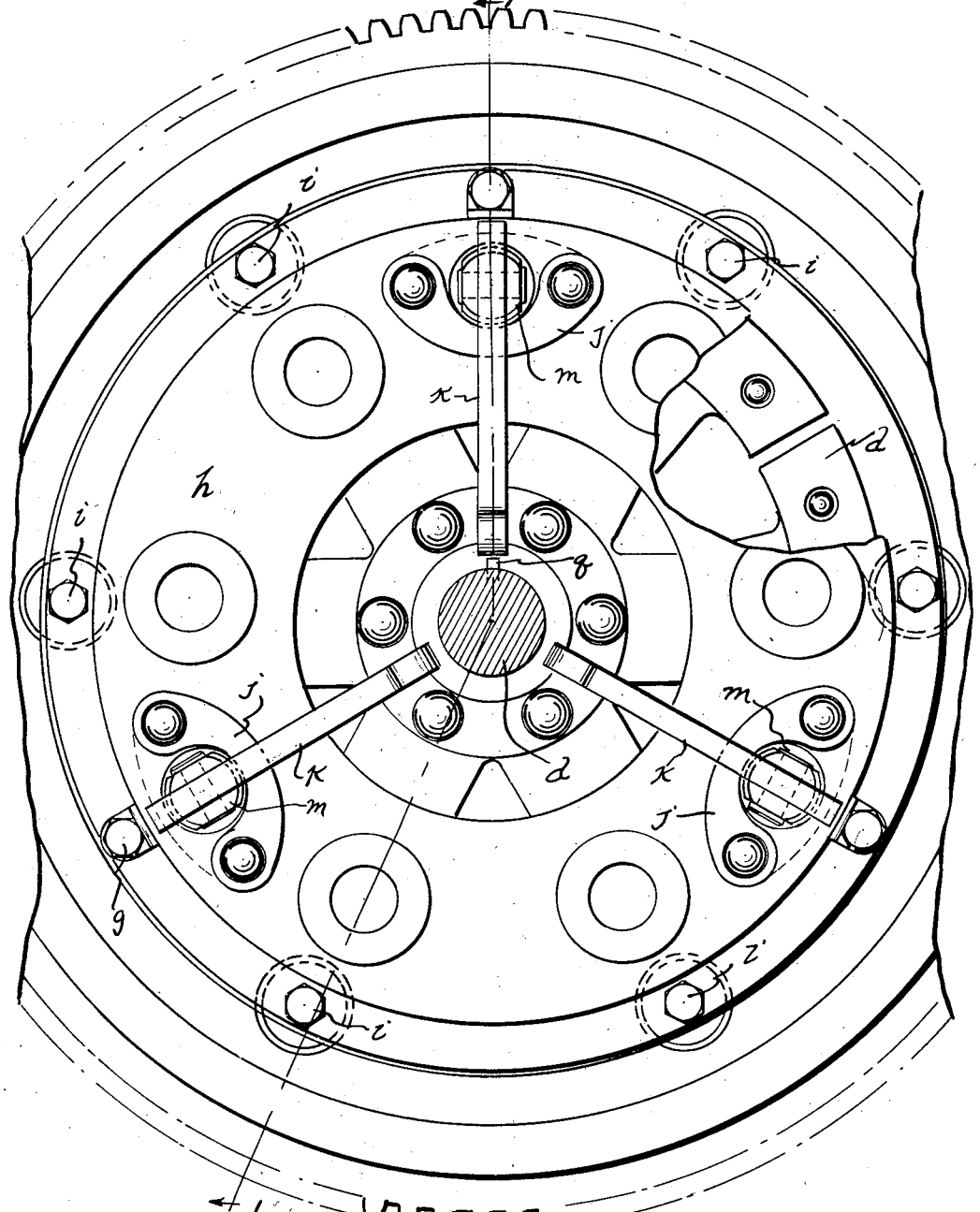

1,660,020

UNITED STATES PATENT OFFICE.

ERNEST E. WEMP, OF DETROIT, MICHIGAN.

CLUTCH.

Application filed October 1, 1924. Serial No. 740,912.

This invention relates to clutches of the disc or plate type of clutch in which all the clutch parts are a complete unit furnished by the clutch manufacturer as distinguished from the usual type of clutch wherein the fly wheel is one of the driving members of the clutch.

Another object of the invention is to provide a clutch in which the driven member is securely anchored on to the driven shaft as distinguished from the usual type of clutch where the driven member is splined on the driven shaft. This is made possible by an arrangement whereby the driving clutch members are not bolted to the fly-wheel, as is ordinarily the case, but are floated around the driven member or members and are provided with an adjustable stop member for contacting with the fly-wheel when the clutch is released. This determines the amount of clearance between the driving member and the driven member when the spring pressure is released. This will be explained in detail hereinafter.

Another feature of this clutch is the employment of a slightly deformable element in the torque line to cushion and relieve sudden changes in the torque effort. Specifically, this is a cushion element between the fly-wheel and the driving studs. The practicability of an element of this kind is largely the result of this clutch design wherein the driving clutch parts are floated on the driven member and not clamped to the fly wheel. This will be more fully described in the specification following.

In the drawings:

Fig. 1 is a longitudinal section through the clutch.

Fig. 2 is a rear elevation of the same.

Fig. 3 is a detail of a modified form of driving stud connection.

$a$ designates the fly wheel provided with the usual starter teeth $b$; $c$ is the pilot bearing in the fly-wheel; $d$ the driven shaft provided with a pilot end $e$ for fitting into the pilot bearing of the fly wheel.

The driving elements of the clutch comprise a driving shell or cage $f$. It is hard to get a term that fits this element for the reason that it takes the place of the fly-wheel itself in the ordinary clutch construction. The other driving member is the pressure ring $g$. The cover plate $h$ is bolted to the driving shell $f$ by means of the bolts $i$. The pressure-releasing levers $k$ fulcrum on the blocks $j$. The pressure relieving levers $k$ are also tied to the pressure ring $g$ by the bifurcated studs $m$. This cover plate acts as an abutment for a plurality of helical clutch springs $n$ that tend to thrust the pressure ring $g$ forward to pack the clutch discs.

The driven disc is the thin metal disc $o$ provided on its outer zone with the usual clutch facings $p$. A disc very suitable for this purpose is described and claimed in my Patent No. 1,485,319. A disc of this kind is capable of considerable flexure without crystallizing and breaking, and immediately resumes its natural condition after deformation. A disc of this kind is ordinarily mounted upon a hub which is splined to the driven shaft so that it may adjust itself to the fly-wheel position when the parts are assembled together. This splining of the driven disc on the driven shaft leaves a considerable amount of looseness between the driven element and the shaft which is undesirable but which was heretofore thought necessary in order to make the necessary adjustment in assembling the clutch elements with respect to the fly wheel.

It is the purpose of my improved clutch to so arrange the elements that the driven member or members may be tightly clamped and jammed onto the driven shaft. This is done by means of a tapered hub, shaft and key $q$ and a jam nut $r$, and threads $s$ on the shaft.

The operation and the remaining parts of the clutch can best be described and understood by detailing the installation: the clutch assembly comes as a complete unit from the clutch manufacturer; the same is slipped over the end of the driven shaft and anchored in place by the jam nut $r$. The transmission case, together with the driven shaft, is now moved up toward the end of the crank case; the pilot end $e$ of the driven shaft being guided into the pilot bearing $c$. The crank case flange $t$ and the transmission case flange $u$ are matched together. The driving studs $v$ with their washers of deformable material $w$ are fitted through the openings $x$ in the fly-wheel.

These washers are preferably made up of a plurality of overlaid fabric discs vulcanized together so as to make them slightly deformable. There is a small clearance between the washer and the perforation in the fly-wheel when the same is fitted therethrough. However, afterwards the nut $y$ may be turned down against the washer to slightly deform and expand the same, and afford a relatively tight fit. In Fig. 3, a slightly modified form of mounting and deformable washer is shown. Here a bolt in place of a threaded stud is used. This permits the turning of the nut z on the rear of the clutch unit to expand the washer. Either one mounting or the other may be preferable depending upon the design of power unit and the resulting accessibility of the parts for adjustment. However, it will be evident that a slight cushioning element is inserted in what I call the torque line, that is, in the parts that transmit the driving effort. Obviously the sudden starting or stopping or a sudden acceleration or deceleration of the engine throws a considerable shock on the parts driven by the engine due to the inertia and the slight yield that can take place between the engine and the parts driven by the engine relieves both parts of a considerable part of the shock due to overcoming this inertia.
I have explained the installation of the clutch assembly on the end of the driven shaft. The levers k are held from flying out beyond the given point due to the springs n before the cover plate is bolted to the driving cage f. This is effected by the shoulders 11 when the levers contact with the cover plate. After the cover plate h is bolted to the cage f, the levers cannot fly out for the reason that the pressure ring g abuts against the driven disc o and the latter against the driving element or cage f. The clutch assembly now floats, so to speak, on the flexible driven member o. Contrary to the usual practice, it is in no way clamped to the fly-wheel but is coupled up to the fly-wheel in driving relation by means of the driving studs v and the deformable washers w.

The adjusting screws 2 are now turned until they contact with the face of the fly-wheel. They are then backed off, say thirty-thousandths of an inch or about half a turn. This establishes a permanent clearance between the driving cage f and the fly-wheel except when the clutch releasing pressure is applied. When the clutch releasing pressure is applied the thrust on the ends of the levers is communicated to the fulcrum blocks and the first thing that occurs is that the entire clutch assembly moves forward until the adjusting pins strike the fly-wheel. A continuance of the pressure on the levers then serves to draw the pressure ring g from the driven disc o. It will be apparent that when the clutch assembly moves forward as a unit it bends the driven disc forward along its outer zone for this driven disc is fixedly anchored at its hub. This causes the distortion of the driven disc but immediately thereafter the pressure is released on this driven disc and it springs back to its normal position, establishing a clearance between the driving cage and the driven disc. The exact amount of this clearance depends altogether upon how far the adjusting screw has been backed away from the fly-wheel after touching it. Hence the clearance is nicely adjustable by adjusting these screws.

In order to make the claims clearer in meaning, it may be stated that the "driving member" referred to in the claims is the fly-wheel, the "driven member" is the driven shaft, the "driving element" is the driving cage f, and the "driven element" is the flexible disc o. However, I do not mean to be limited to these exact elements, but am simply applying the terms of the claims to the specific elements found in the drawings. A number of the claims call for spacing means. This is the adjusting screw. Strictly speaking, this adjusting screw is technically a spacer only when the clutch disengaging pressure is applied, but it is thought that at the same time it possibly describes the element as well as may be.

What I claim is:

1. In a clutch, the combination with a driving member and driven member, of a clutch assembly comprising driving and driven elements in which the driven element is rigidly anchored to the driven member and deformable in releasing the packing pressure and the driving element has two axially separable parts and is provided with an adjustable spacer with respect to the driving member but is not clamped thereto, said spacer regulating the amount of deformation of the driven element and hence the clearance when the disengaging action is completed.

2. In a clutch, the combination with a driving and driven member, of a clutch assembly comprising driving and driven elements together with spring means for packing the same, and means for relieving the pressure, the said driven element being permanently anchored to the driven member and the driving element being coupled in driving relation with the driving member but provided with an adjustable contact member which can be backed away from the driving member to regulate the amount of clearance between the parts when the clutch is disengaged.

3. In a clutch, the combination with a driving and a driven member, of a clutch assembly comprising driving and driven elements together with spring means for packing the same, and means for relieving the pressure, the said driven element being deformable toward the driving member and permanently anchored onto the driven member, and the said driving element being composed of two parts axially separable when the packing pressure is removed and coupled up in driving relation with the driving member, but adjustably spaceable with respect thereto to alter the amount of distortion of the driven element and consequently control the amount of clearance between the elements when the packing pressure is relieved.

4. In a clutch, the combination with a flywheel and a driven shaft, of a clutch assembly comprising a driving element and a cover plate clamped together, a driven disc and a pressure ring engaging between the driving element and the cover plate, spring means for abutting against the cover plate and the pressure ring to pack the said driving and driven members, means for relieving the spring pressure, the said driving element being coupled up in driving relation with the fly-wheel but slidable axially with respect thereto, and an adjustable spacer carried by one of the members—fly-wheel and driving element—and for abutting against the other to adjust the elements, whereby the amount of separation of the elements when the packing pressure is released is regulated.

5. In a clutch, the combination with a flywheel and a driven shaft, of a clutch assembly comprising a driving element and a cover plate, the driving element of two separable parts separable when the packing pressure is relieved and coupled up in slidable but driving relation with the fly-wheel and the cover plate clamped to the driving element, a driven element and pressure ring engaging between the driving element and cover plate, springs pressing against the cover plate and the pressure ring, levers fulcrumed on the cover plate and tied to the pressure plate for relieving the spring pressure, and spacing means between the driving element and the fly-wheel for adjusting the separation of the driving and driven elements when the packing pressure is relieved.

6. In a clutch, the combination of a plurality of clutch elements that can be brought into engaging and driving relation and including two members, one of which is perforated and the other of which is provided with a driving connection with a deformable washer and having means unrestrained in expanding the washer after the same has been located in the perforation of the driving member.

7. In a clutch, the combination with a driving and a driven member of a clutch assembly comprising driving and driven elements together with spring means for packing the same and means for relieving the pressure, the said driven element being permanently anchored to the driven member and being distortable, the said driving element having two parts that are separable when the packing pressure is relieved and being arranged when the clutch is engaged to float on the driven element in slightly spaced relation with respect to the driving member, the spacing determining the amount of distortion that takes place in the driven element when the pressure relieving means is first applied, and hence the amount of clearance that exists between the parts when the clutch is completely disengaged and the driven element returns to its normal position.

8. A clutch, having in combination a driving member, a driving element provided with a cover plate, a driven element, a pressure ring enclosed between the driving element and the cover plate, means for affording packing pressure, means by which pressure may be released, and a driving connection between the driving element and the driving member permitting movement of the driving element axially with respect to the driving member but forming a cushion in the line of torque.

9. A clutch, having in combination a driving member, a driving element provided with a cover plate, a driven element, a pressure ring enclosed between the driving element and the cover plate, means by which pressure may be released, and a driving connection between the driving element and the driving member comprising a stud having a yieldable cushion surrounding the same thereby permitting movement axially of the members but cushioning the same in the line of torque.

10. A clutch, comprising a driving member, a driving element, a connection between the same which includes a block of deformable material and which permits a slight yield in the line of torque and relative movement between the member and element transverse to the yield, a driven element, a spring means for packing the driven element and the driving element together, and mechanical means for releasing the same.

11. In a clutch, the combination of a driving unit involving two driving parts which can move together and also apart, a driven element, a driven member to which the driven element is fixed, and means whereby the driving unit moves in one direction with respect to the driven member to thereby distort the driven element and then by which the two driving parts separate from each other so that one driving part moves away from the driven element and the driven element moves away from the other driving part by assuming its normal position.

12. In a clutch, the combination of a driving unit involving two driving parts which can move together and also apart, a driven element, and means whereby the driving unit moves in one direction a determinable amount subject to adjustment thus distorting the driven element and by which thereupon the two driving parts separate and one driving part draws away from the driven element and the driven element draws away from the other driving part.

13. In a clutch, the combination of a driving member, a driven member, a driving element fixed in driving relation with the driving member, a driven element fixed to the driven member, said driving element being bodily movable and consisting of two parts movable relative to each other, the said driven element being flexible to permit movement bodily of the driving element.

14. In a clutch, the combination of a driving member and a driven member, a driving element in driving relation with the driving member, arranged to move bodily longitudinally of the driving and driven members, said driving element consisting of two parts movable relative to each other, and a driven element immovably fixed to the driven member, and being distortable and lying between the said two parts of the driving element, means for packing the two parts of the driving element against the driven element to effect a driving connection, and means for causing movement bodily of the driving element, and relative movement between its parts for disengaging the driving connection.

In testimony whereof I have affixed my signature.

ERNEST E. WEMP.